Oct. 1, 1929.  W. C. STEVENS  1,730,307
STOCK ASSEMBLING DEVICE
Filed Dec. 17, 1924  9 Sheets-Sheet 1

INVENTOR.
WILLIAM C. STEVENS
BY
ATTORNEY.

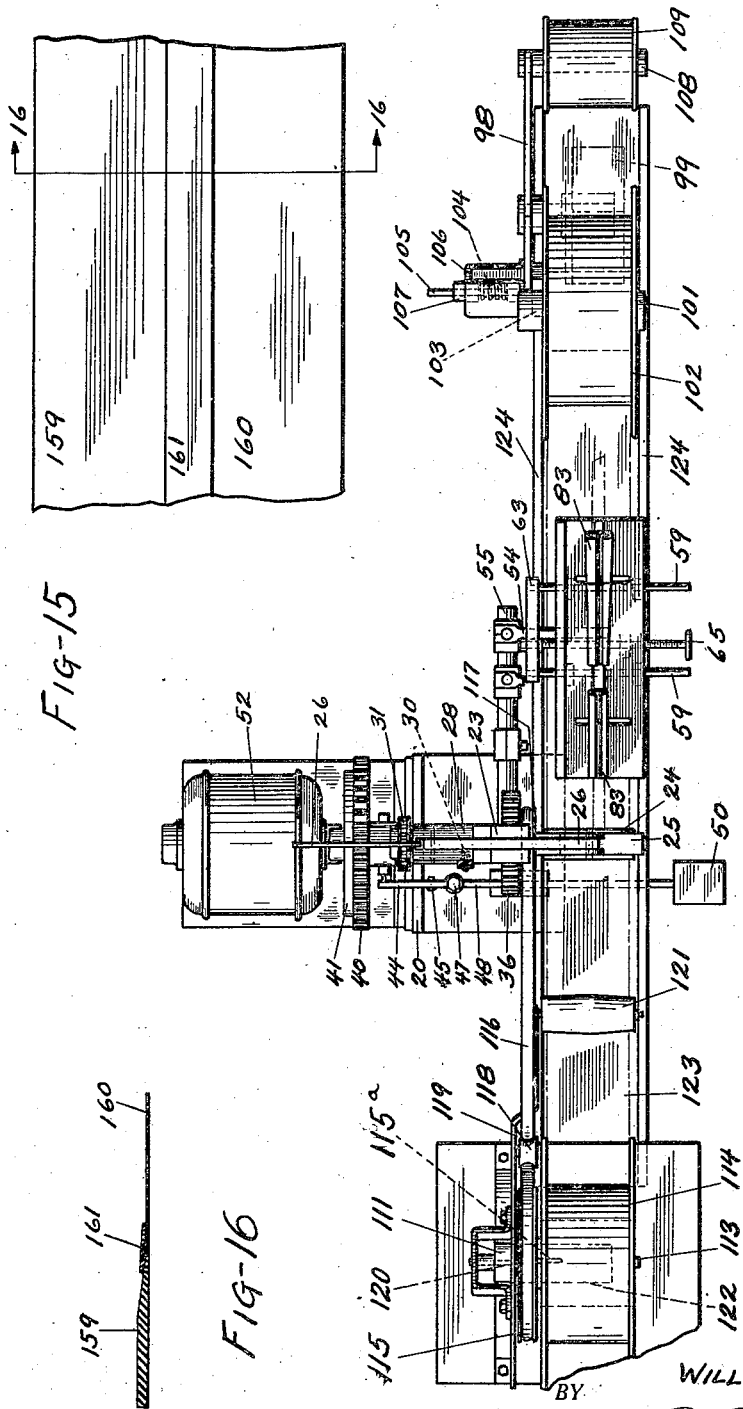

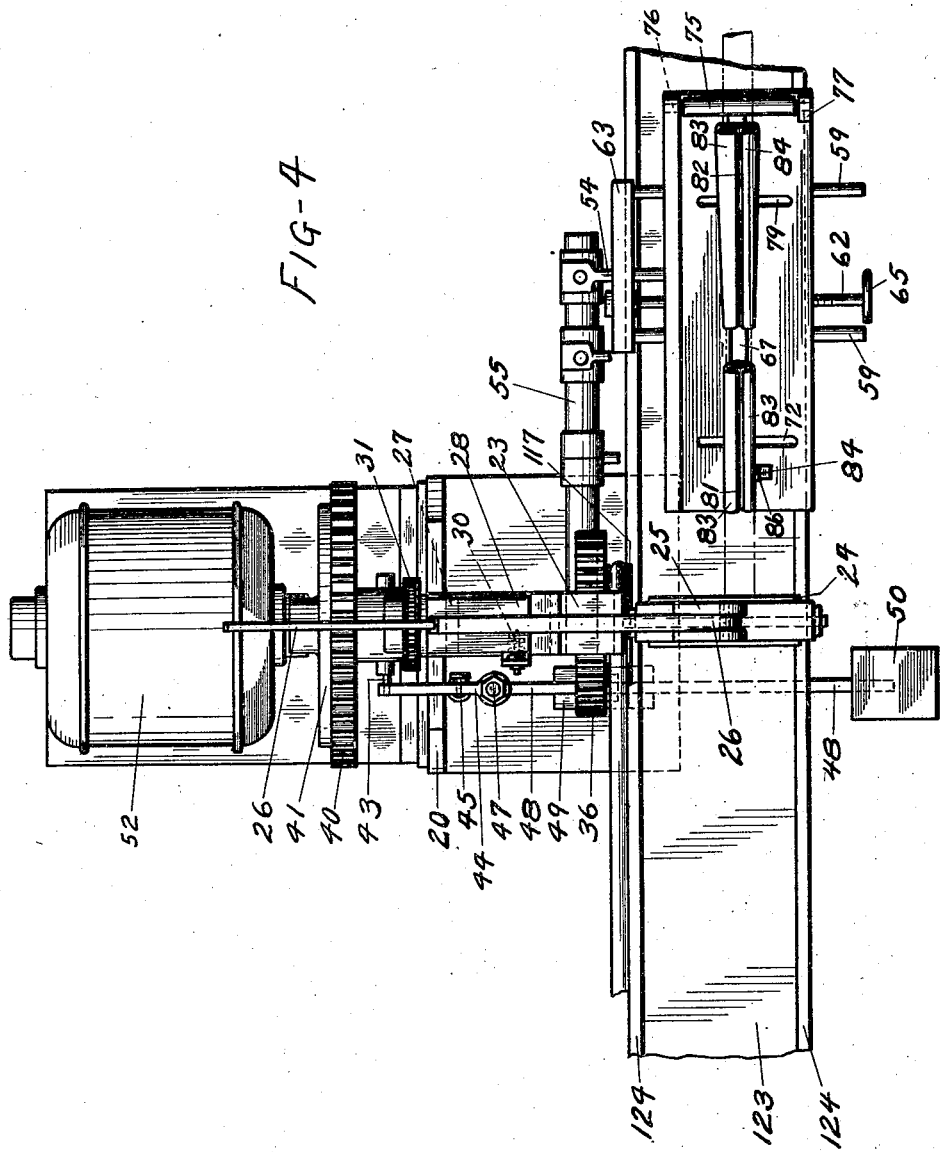

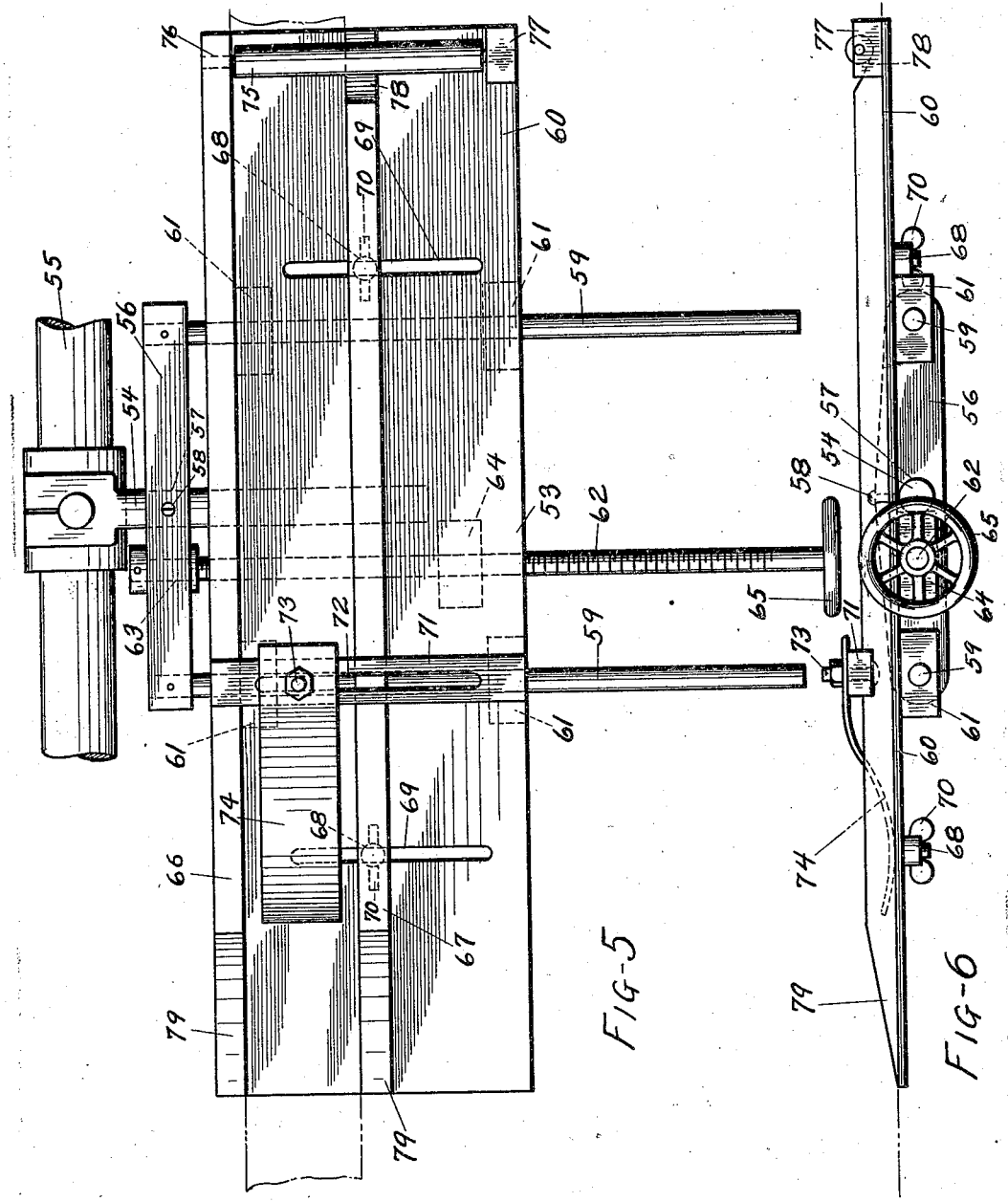

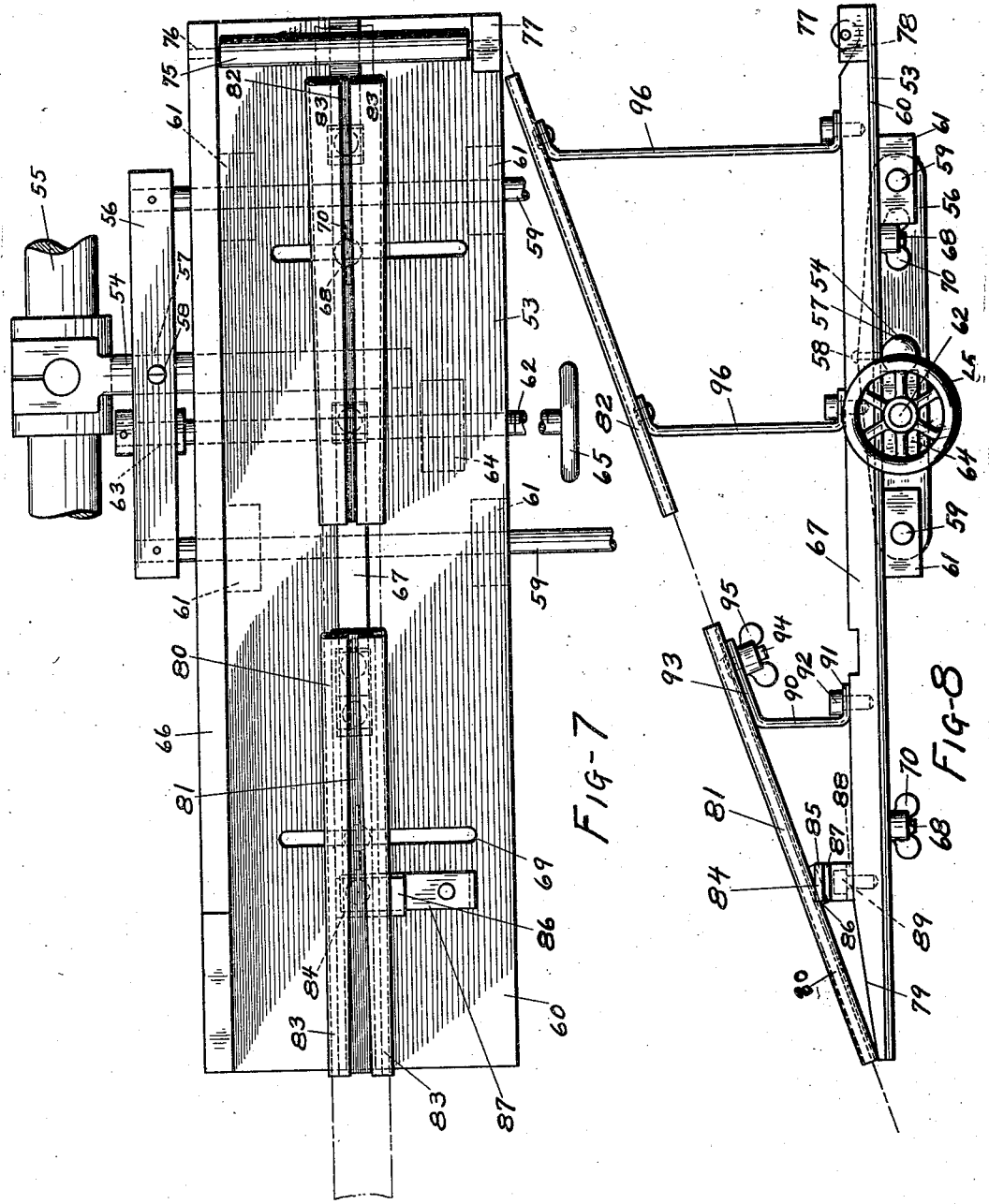

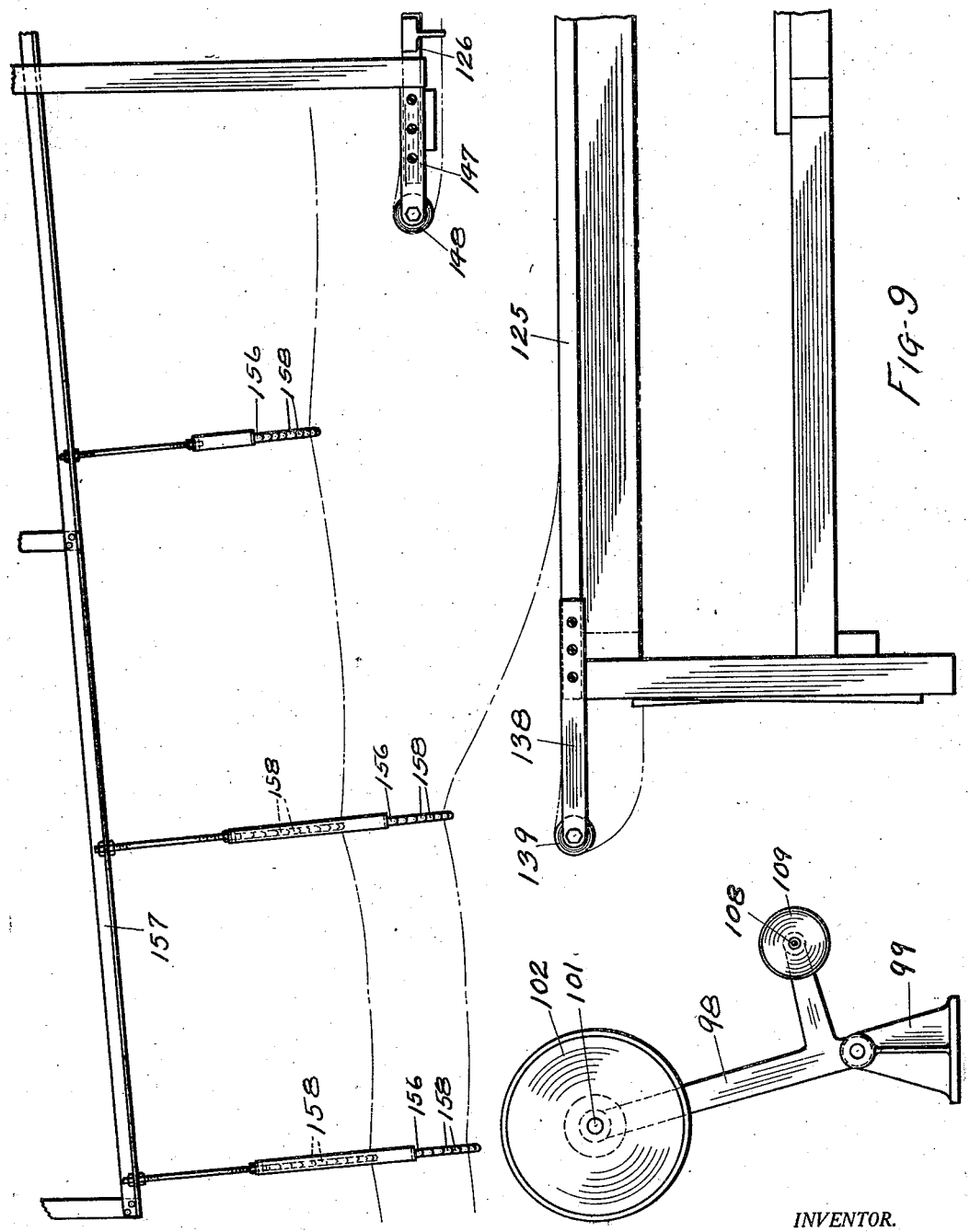

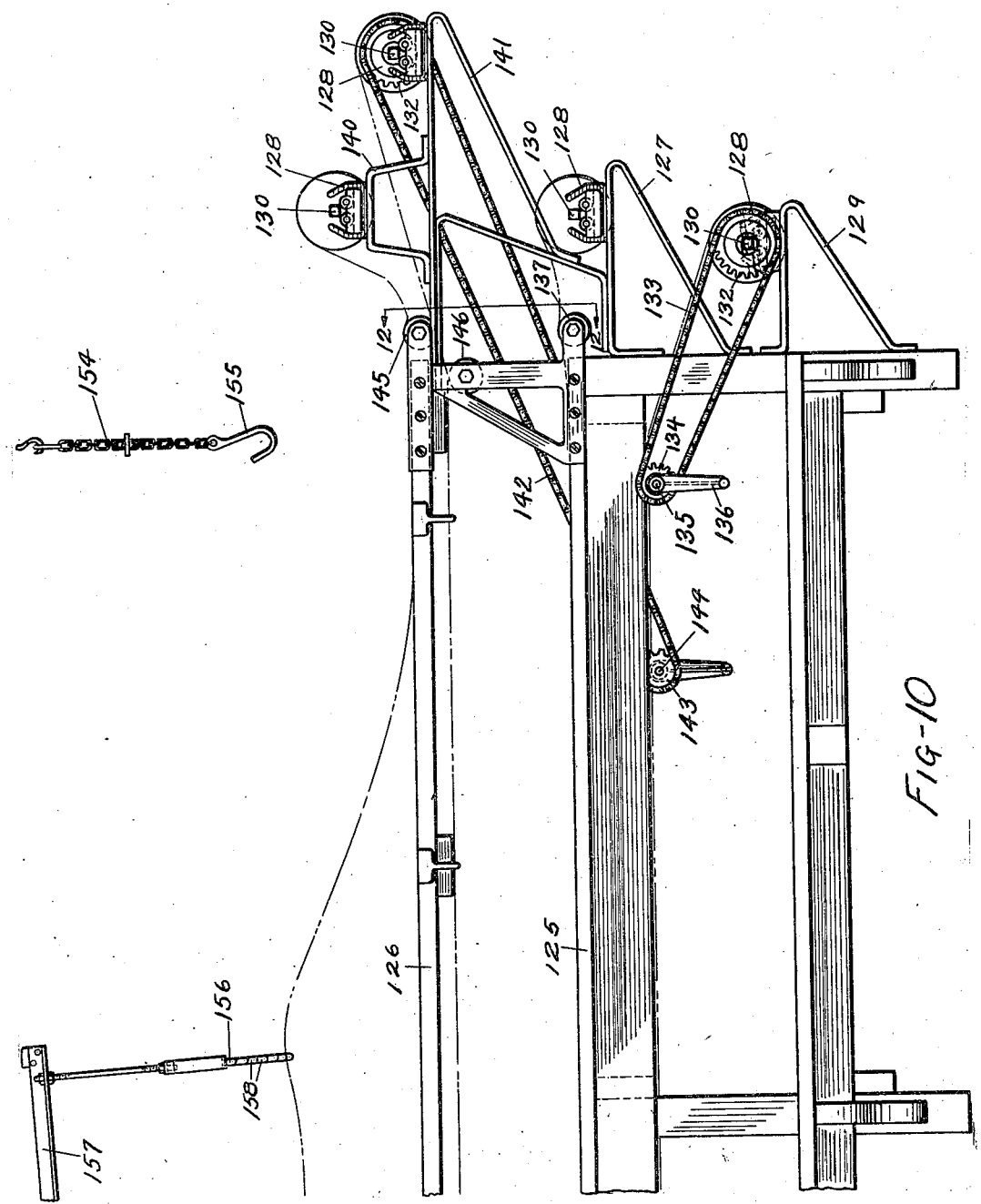

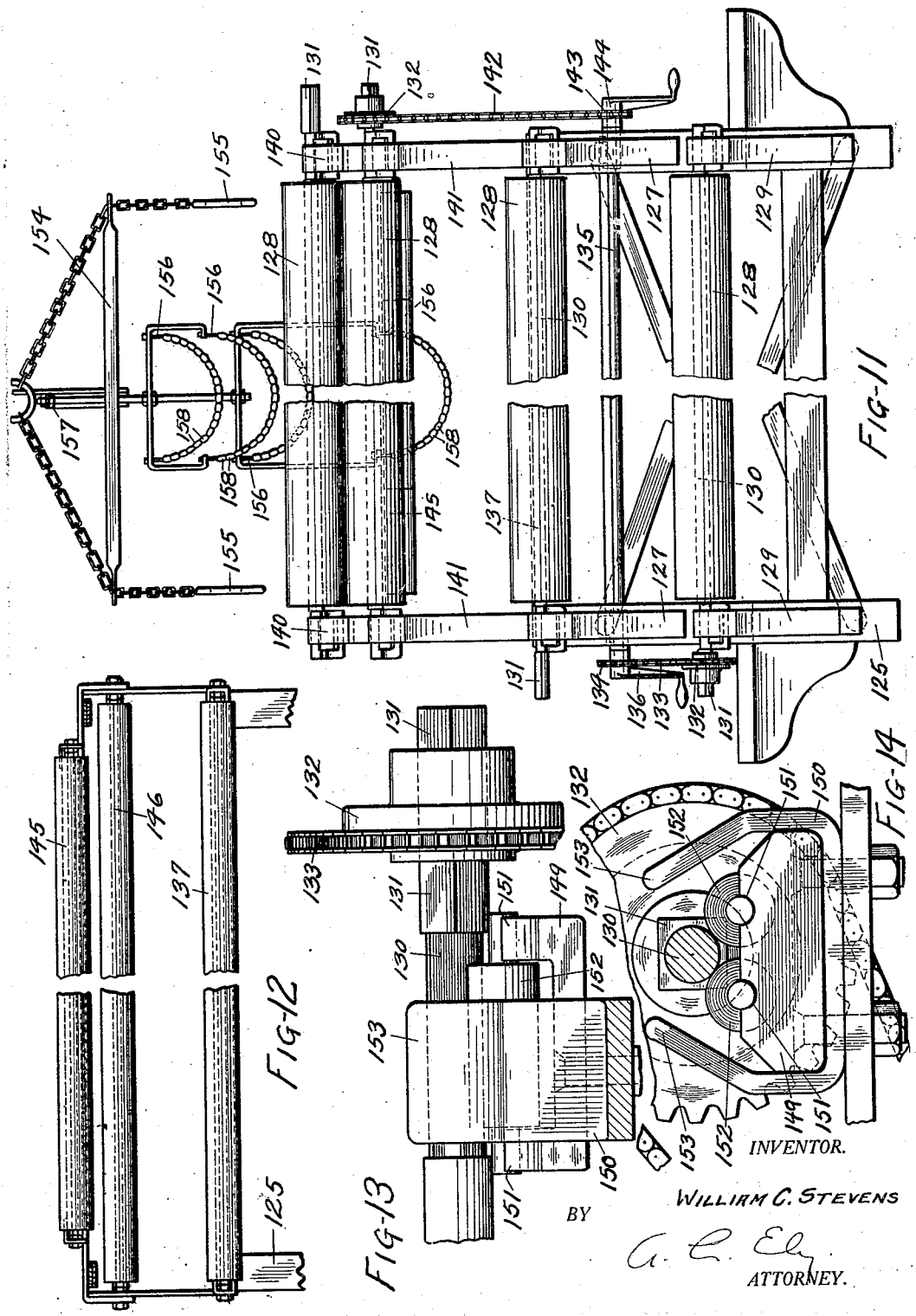

Patented Oct. 1, 1929

1,730,307

UNITED STATES PATENT OFFICE

WILLIAM C. STEVENS, OF AKRON, OHIO, ASSIGNOR TO THE FIRESTONE TIRE & RUBBER COMPANY, OF AKRON, OHIO, A CORPORATION OF OHIO

STOCK-ASSEMBLING DEVICE

Application filed December 17, 1924. Serial No. 756,540.

This invention relates to devices for assembling strips of fabric and rubber and is particularly directed to machines for making composite sheet material, including side wall and chafer stock, for use in the construction of pneumatic tire casings.

In the manufacture of pneumatic tires, the outer casings are made by building up carcasses consisting of plies of rubberized fabric superimposed upon each other and having secured at their edges reinforcements or "beads" adapted to fit on automobile rims and to hold the tires thereon. The carcasses are then "finished" by applying side walls of rubber stock, chafer strips of fabric to overlie the beads, and rubber treads. The present invention is particularly directed to means for preparing reels of composite strip material including the side wall and chafer strips and gum strips overlying the joints between the first mentioned strips. The various benefits to be derived from the invention, however, may be derived in various other constructions than the one illustrated in the accompanying drawings and machines constructed according to the invention also may be employed to make various kinds of composite strip material for similar or for other purposes than the specific one illustrated.

The chief object of the invention is to provide a unit including means for pressing the various strips together to form the composite strip and to provide means for accurately guiding the separate strips into proper relation to be secured together by the pressing means.

Another object of the invention is to provide an improved reeling device for feeding strip material to the assembling unit and for reeling the composite material as it comes from the unit.

Another object of the invention is to provide improved stock supplying tables for use with the assembling units whereby a number of continuous strips of material of different character, such as bias cut stock, may be expeditiously supplied to the assembling unit.

The foregoing and other objects are realized in the structure described in detail below and illustrated in the accompanying drawings, it being understood that the invention is not limited to the specific structure shown and described.

Of the accompanying drawings:

Figure 3 is a plan thereof;

Figure 4 is an enlarged detail plan thereof;

Figure 5 is a plan view of one form of strip guiding means;

Figure 6 is a side elevation thereof;

Figure 7 is a plan illustrating a strip guiding attachment mounted on the guiding means shown in Figures 5 and 6;

Figure 8 is a side elevation thereof;

Figure 1:
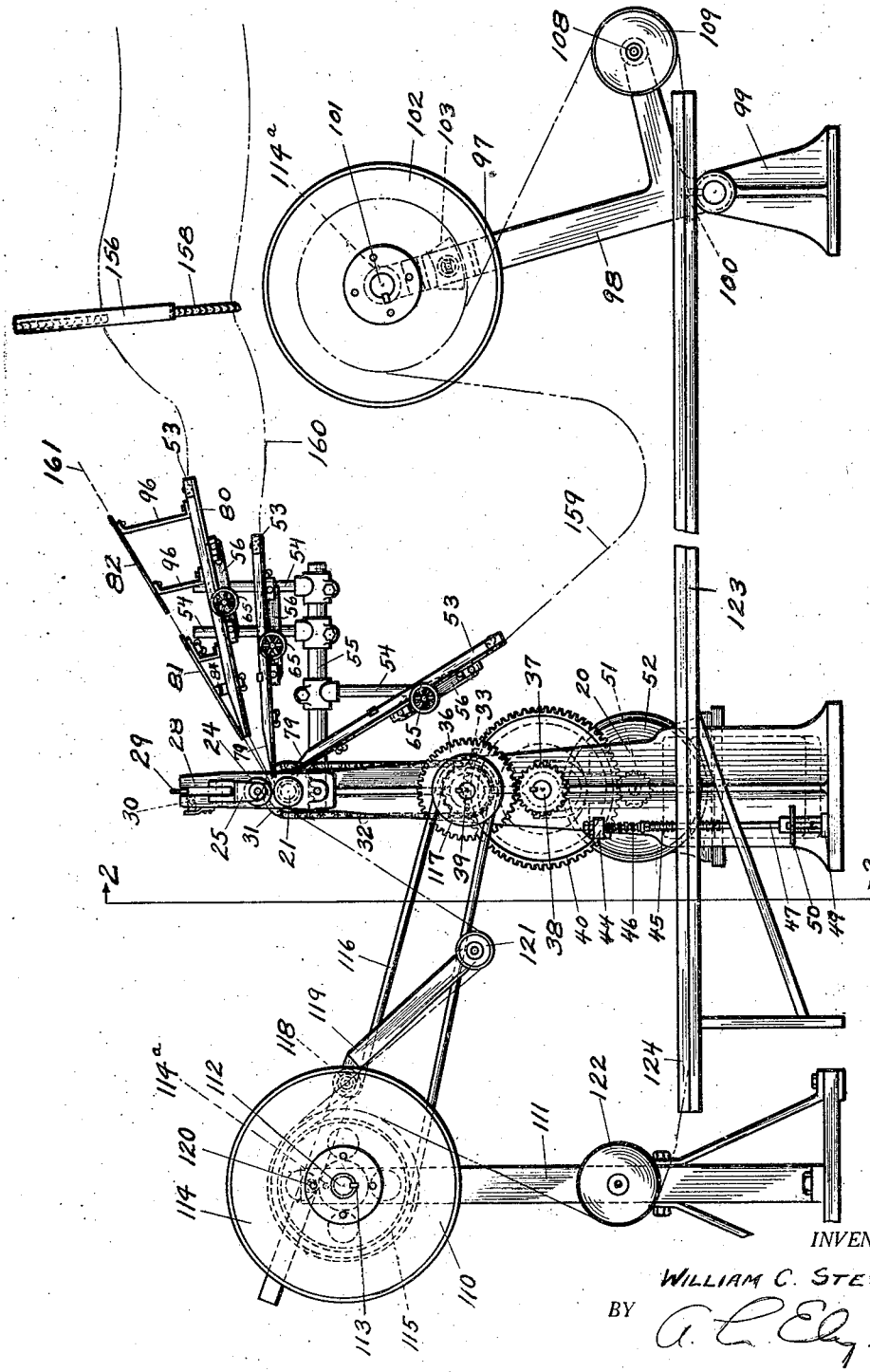
Figure 1 is a side elevation of an assembling unit embodying the invention.

Figures 9 and 10, taken together, illustrate, in side elevation, a stock supplying device;

Figure 11 is the right end elevation thereof;

Figure 12 is a section on line 12—12 of Figure 10;

Figure 13 is a detail end elevation of a reeling device used with the stock supplying device shown in Figures 9 to 12;

Figure 14 is a detail side elevation thereof;

Figure 15 illustrates, in plan, one kind of composite strip material made by the machine of the invention; and Figure 16 is a transverse section on line 16—16 of Figure 15.

Referring to the drawings, 20 represents a supporting standard or bracket for the assembling unit which includes a roller 21, secured on a shaft 22, journaled in a bearing 23 formed in the top of bracket 20, and a second roller 24 movable into abutting relation with roller 21 by being journaled on a bracket 25 secured on one end of a lever 26 which is pivoted at 27 on a bracket 28 mounted on the top of standard 20. The lever 26 is formed with an operating handle 29 on its other end and is normally held in position with the rollers 21 and 24 in abutting relation by a spring-pressed pin 30.

Roller 21 is arranged to be driven by a sprocket 31 on shaft 22 over which sprocket is trained a chain 32, the latter being trained over a sprocket 33 on a shaft 34 which is journaled in a bearing 35 in standard 20. On shaft 34 is a gear 36 meshed with a gear 37 on a main drive shaft 38 which is journaled in a bearing 39 in standard 20. Rotatable and slidable on shaft 38 is a gear 40 adapted to be clutched to shaft 38 by engaging a friction disk 41, the gear 40 being adapted to be moved into engagement with the disk by an arm 42 secured on a shaft 43 on which is secured an arm 44, to which is connected one end of a tensile spring 45 secured at its other end to standard 20 and tending normally to disengage the clutch. Yieldingly connected to arm 44 by a compression spring 46 is a rod 47 which is adapted to be shifted vertically to operate the clutch against the action of spring 45 by a pedal lever 48 pivoted on a bracket 49 mounted on the base of standard 20, the lever 48 extending outwardly from the side of the machine and being provided with a treadle 50. Gear 40 may be adapted to be continuously rotated in any suitable manner as by a gear 51 on the rotor shaft of a motor 52.

Arranged for guiding the various strips into proper relation to be pressed together by rollers 21 and 24 are a plurality of strip guiding devices 53 angularly adjustable on arms 54, which latter are angularly adjustable on a bracket arm 55 mounted on standard 20. Each device 53, (Figures 5 and 6) comprises a bar 56, pivoted at 57 on arm 54 and adapted to be secured in any angular position thereon, as by a set screw 58. The bar 56 has secured therein, so as to extend outwardly therefrom, a pair of parallel rods 59, 59 on which is slidably mounted a guide plate 60, the latter being provided with bearings 61, 61 on its under surface for sliding engagement with rods 59. For adjusting plate 60 to any position on rods 59 a threaded shaft 62 is journaled at 63 in the bar 56 and is arranged to extend through a threaded aperture in a lug 64 on the bottom of plate 60. Shaft 62 has a hand wheel 65 on its outer end to facilitate rotation thereof.

Guide plate 60 is formed with a fixed guide rail 66 on its inner end and is provided with a second guide rail 67 adjustable over the surface thereof toward or from plate 66. Suitable means for securing guide rail 67 in adjusted positions, consists in screws 68, 68 secured on the bottom of rail 67 and projecting through slots 69, 69 formed in plate 60, wing nuts 70, 70 being provided to screw onto screws 68 to clamp rail 67 on to plate 60 in the desired positions. A drag device for tensioning the strip material as it is drawn through guides 53 between rollers 21 and 24 may be provided on the guides 53 by mounting a bar 71 on rails 66 and 67 so as to span the latter and providing a slot 72 in the bar for receiving a clamping bolt 73 for securing a drag plate 74 so that it will press on strip material passing between rails 66 and 67. To properly guide and retain strip material between the guide rails, a roller 75 is journaled on the strip-entering end of plate 60 in a bearing 76 in guide rail 66 and in a bearing block 77 provided on the upper surface adjacent the outer edge of plate 60. Guide rail 67 is cut away as at 78 to clear roller 75. The ends of guide rails 66 and 67 adjacent the pressure rollers 21 and 24 are beveled away as indicated at 79, 79 to permit of positioning devices 53 closely adjacent to the nip of the rollers.

An attachment 80 for guiding devices 53, used for guiding certain kinds of strip material, such as a narrow gum strip for overlying the joint between the side wall strip and the chafer strip, is illustrated in detail in Figures 7 and 8. The attachment 80 comprises guides 81 and 82 formed with reversely bent marginal flanges 83, 83 for guiding and retaining the strip material in the guides. Guide 81 is pivoted at 84 on a bracket 85 formed of a flat strip provided with a twisted portion to form an inclined upper surface 86. Bracket 85 is mounted on a supporting bracket 87 formed of a second flat strip bent downwardly and formed with a flange 88 adapted to seat on a guide rail 66 or 67 and to be secured thereon by a screw bolt 89. The rear end of guide 81 is adjustably supported on a bracket 90 formed of a flat strip of metal bent so as to provide a flange 91 for seating it on a guide rail 66 or 67, bracket 90 being adjustably secured thereon by screw bolt 92. Bracket 90 is also formed with an inclined seating portion 93 for supporting the guide 81 which is adapted to be secured thereon by a bolt 94 and wing nut 95. The angular position of bracket 90 is thus adapted to be varied to vary the angularity of guide 81. Guide 82 is non-adjustably secured on rail 66 or 67 by brackets 96, 96, this guide being adapted to prevent the strip material sagging onto guide 53, the guide 82 being especially required when, as is frequently the case the guide 53 and the attachments 81, 82 are used simultaneously to direct two different strips between rollers 21 and 24.

For furnishing one continuous length of material to the assembling unit, for example, the side wall stock, an unreeling device 97 may be employed. The device 97 includes a bracket 98 pivotally adjustable on a stationary bracket 99 mounted adjacent the standard 20 on the feeding-in side of the assembling unit, the bracket 98 being secured in adjusted positions on bracket 99 by screw bolt 100. The bracket 98 is formed substantially of L-shape and on the upper end of the long arm thereof there is provided a spindle 101 for removably receiving a reel 102 adapted to rotate thereon and secured from sliding therefrom in a suitable manner. A spring-pressed brake 103 is arranged adjacent the spindle 101 on bracket 97 so as to engage the side of the reel, the brake being urged against the reel by a spring 104 encircling a rod 105 secured to the brake 103 and slidable in a bracket 106. The pressure of the spring 104 on the brake may be varied by a nut 107 threaded through bracket 106 and abutting the spring 104. The stock supplied by reel 102 has previously been wound with a liner in the conventional manner of reeling rubber stocks and accordingly the short arm of bracket 97 has a spindle 108 thereon, on which is journaled a liner guiding roller 109 for removing the liner from the reel and separating it from the sidewall stock which is drawn over one guide 53, the liner being conducted to a point for winding up with the assembled stock, as will appear. The other stock to be assembled may be fed to the guiding devices 53 by any suitable means, one type of which will later be described.

In order that the assembled stock may be reeled so that it may be carried to the point where it is applied to tires, or other articles, a reeling device 110 is provided on the opposite side of the assembling unit from the unreeling and strip guiding devices. The reeling device 110 consists of a standard 111 installed a short distance from the standard 20 and having on its upper end a spindle 112 secured thereon and adapted to have removably journaled thereon as by a suitable latch 113, a wind-up reel 114. Spindle 112 has a pulley 115 journaled thereon and trained over pulley 115 is a belt 116, the latter being driven by a pulley 117 on shaft 34 on the standard 20. Pulley 115 has a pin 115$^a$ thereon adapted to project into an aperture 114$^a$ in reel 114 to drive the reel. The driving of reel 114 by belt 116 is adapted to be controlled by the speed at which the assembled stock is delivered by rollers 21 and 24. To this end, the belt 116 is of such length as to be extremely loose and it is adapted to be maintained in taut condition by a roller 118 resting thereon, the roller 118 being journaled onto a weighted lever 119 pivoted at 120, 120 on standard 111. Lever 119 has a roller 121 journaled on the free end which is between the assembling unit and the wind-up reel 114 and is adapted to rest on the assembled stock to form a festoon between the assembling unit and reel 114. The amount of fabric in the festoon is thus adapted to control the speed of reel 114.

Figure 2:
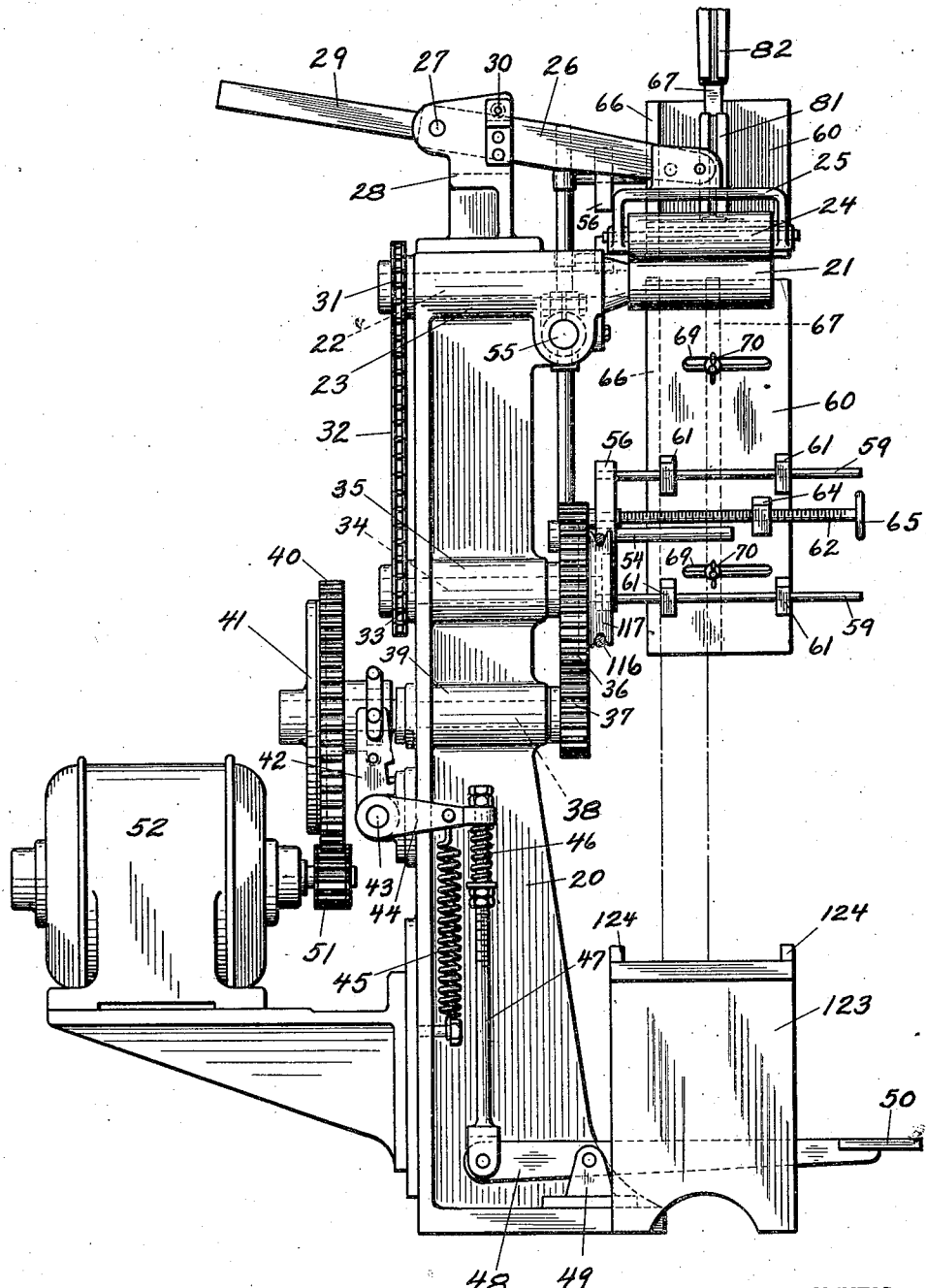
Figure 2 is an enlarged section on line 2—2 of Figure 1.

For winding a liner on reel 114 with the assembled stock, a liner guiding roll 122 is journaled on standard 111, the liner from reel 102 preferably being drawn therefrom over roller 109 and under roller 122. To prevent the liner from sagging onto the floor and thus becoming dirty, a table 123 is arranged between rollers 109 and 122, the table 123 having guiding rails 124, 124 on its side edges (Figure 2) to guide the liner in its travel on the surface thereof.

In the construction of assembled stock there are frequently used one or more continuous strips of bias cut fabric. As bias cut fabric is supplied from the cutters in comparatively short strips lying diagonally on the surface of a liner, it is desirable that a device for facilitating the assembling of these short strips for feeding in a continuous length to the assembling unit be provided. A suitable form of device is illustrated in Figures 9 to 14. Mounted to the right of the reeling device 97, as illustrated in Figures 9 and 10, is an assembling table 125 for bias cut stocks. The table 125 has thereon an upper deck 126 so that in the specific form shown two different bias cut stocks could be supplied the assembling unit. It will be understood that there may be one or more decks on a table for supplying two or more strips of bias cut stock.

On the right end of table 125 there are mounted brackets 127 supporting spaced reeling devices 128 later to be described in detail, on which a supply roll of liner containing bias cut stock and wrapped onto a pole 130 may be mounted. On brackets 129, on the right end of table 125 below the brackets 127, there is a second set of reeling devices 128 adapted to receive another pole 130 onto which the liner may be wound after the bias cut stock is removed therefrom. The poles 130 are formed with squared ends 131 and a sprocket 132 is provided, the sprocket having a squared aperture for slipping over the squared ends 131 whereby the poles 130 may be driven when reeling a liner thereon, a chain 133 being trained over the sprocket 132 and over a sprocket 134 on a shaft 135 journaled on table 125 and adapted to be rotated by a crank 136. On the right upper edge of table 125 is journaled a roller 137 and on the left upper edge there is connected a pair of spaced extensions, indicated at 138 in which is journaled a roller 139. Thus the liner of a supply roll on bracket 127 can be drawn across the top of table 125 over rollers 137 and 139 and back under the top of the table onto pole 130 on bracket 129, on which it is wound.

A similar supply roll supporting and unreeling means, as is used on the table, is provided on brackets 140 on the right end of the deck 126. Also a similar wind-up device, as is used on table 125, is mounted on bracket 141, the sprocket 132 of this device being driven by a chain 142 which may be driven by a sprocket 143 on a shaft 144 journaled on the table 125.

Adjacent the right upper edge of the deck there is journaled a roller 145 and beneath the deck adjacent the right edge thereof is journaled a roller 146. On the left end of the deck there is journaled, on extensions indicated at 147, a roller 148. Thus a liner can be drawn from a roll on bracket 140 over roller 145 over the deck and roller 148, then under the deck over roller 146 and onto the wind-up reel 128 on bracket 132.

The reeling devices 128, as best shown in Figures 13 and 14, each comprise a base block 149 seated in a holder 150, the block and the holder being bolted together and to the supporting bracket. In the upper surface of the block 149, bearings 151, 151 are formed in which are journaled roller bearings 152, 152 for poles 130. The holder 150 is formed with guards 153, 153 for preventing the poles 130 from being accidently jerked or knocked off of the devices 128. A chain hoist 154 provided with spaced hooks 155, 155 is arranged to travel above the table 125 adjacent the right end thereof for handling the rolls of stock and liner or the rolls of liner to remove or mount them on the devices 128.

To carry the stock from table 125 or deck 126 to the assembling unit, a series of semi-circular wire loops 156, 156 are suspended from suitable overhead framework 157 and have journaled thereon wooden rollers 158, 158.

The manner of operation of the various instrumentalities which will be apparent from the foregoing description is briefly summarized below:

A supply reel 102 of side wall stock is mounted on the bracket 98. An initial length of liner, on which there is no stock, is drawn downwardly over roller 109 across table 123 under roller 122 and onto an empty reel 114 which is mounted on standard 111. Usually there will be sufficient liner to extend over to reel 114 and partially wrap thereon before the side wall stock appears. When the side wall stock does appear on reel 102 it is drawn from the liner under roller 75 of the lowermost guide 53 which has been adjusted at the required angle to direct the stock into the nip of rollers 21 and 24, and so that the rail 66 positions one edge of the stock properly with respect to the width of the rollers 21 and 24, so that they can receive it and the other strips in proper relation for assembly. The other rail 67 is adjusted to provide a space slightly greater than the width of the stock between the rails to accurately guide the stock but with sufficient clearance to permit of its rapid passage through the guide without its destruction.

Meanwhile a roll of liner carrying bias cut stock for use as chafer strip has been drawn out on table 125 and alternate adjacent ends of the bias cut strips on opposite sides of the table have been connected, as will be understood, to provide a continuous strip lying in zig zag diagonal courses on the liner on the table. This stock is drawn over certain of the loops 156 onto the next higher guide device 53 which is positioned and adjusted to feed the chafer strip between the rolls into slight overlapping relation with the side wall stock. In some cases a second strip of bias cut stock made up on the deck 126 may be assembled with the other strips by passing it through the top-most guide device 53, which will be similarly positioned and adjusted to secure the proper assembling. A narrow strip of gum material may then be drawn from a suitable reel (not shown) through the attachment 80 on the top guide device, the guide 81 being adjusted so that the gum strip will overlie the joint between the side wall and chafer strip.

When all of the strips have been drawn up through the various guides they are passed together over the pressure roller 21, the roller 24 being moved out of engagement therewith for this purpose. The roller 24 is then moved back into place and locked in position, the initially assembled stock being then drawn under roller 121 and partly wrapped onto reel 114.

The pedal 50 is then depressed and motor 52 being continuously rotating, the roller 21 is driven, thus drawing the various stocks from the assembling tables or reels through the guides and between the rollers. The assembling of the bias stock on table 125 or deck 126 proceeds as the stock is used up, the supply and wind-up rolls being unreeled, reeled, removed and replaced as required.

The assembled stock coming from rolls 21 and 24 forms a festoon supporting roller 21. Reel 114 is driven by belt 116 which tightens onto pulley 115 and drives reel 114 the faster, the greater the amount of assembled stock in the festoon. When the stock tends to become taut between reel 114 and the rollers 21 and 24, lever 119 is moved upwardly and thus loosens belt 116 and permitting slippage thereof.

When reel 114 has been filled and reel 102 emptied reel 114 is removed and transported to the tire building or finishing room and reel 102 is removed and used to replace the reel 114, another reel of sidewall stock on a liner being used to replace reel 102.

As shown in Figures 15 and 16, one product of the apparatus may be a composite strip comprising side wall 159, chafer 160 and gum strip 161. The apparatus is, however, capable of turning out various kinds of assembled stocks efficiently and rapidly at a great saving in expense.

Modifications of the invention may be resorted to without departing from the spirit thereof or the scope of the appended claims.

What is claimed is:—

1. A device for assembling tacky strip materials, said device comprising cooperating pressure rollers, and plurality of guiding means associated therewith, said guiding means being relatively adjustable to each other and longitudinally of said rollers, so as to direct two or more separate strips between the rollers in desired relation to each other and so that they will be pressed together to form an integral composite strip.

2. A device of the character described comprising a pair of pressure rollers, means for feeding strips of material between the rollers, a reel for receiving the material from the rollers and means for driving the reel adapted to vary the speed thereof in accordance with the amount of material between said rollers and said reel.

3. A strip guiding device comprising a support, a guide plate on the support, a fixed guide rail on the plate and a second guide rail adjustable toward and from the fixed guide rail, said plate being adjustable in its own plane on said support.

4. A strip guiding device comprising a support, a guide plate on the support, a fixed guide rail on the support and a second guide rail adjustable toward and from the fixed guide rail, said plate being adjustable in its own plane on said support and also adjustable into any desired angular plane thereon.

5. A device of the character described comprising cooperating pressure rollers and a strip-guiding means associated therewith so as to direct material between the rollers, said means including a guide plate, a support for said plate, and means for securing the plate in various positions of adjustment longitudinally of the rollers.

6. A device of the character described comprising cooperating pressure rollers and a strip-guiding means associated therewith so as to direct material between the rollers, said means including a guide plate, a support for said plate, and means for securing the plate in various positions of adjustment to direct material at any desired angle toward the bight of said rollers.

7. A device of the character described comprising cooperating pressure rollers and a strip-guiding means associated therewith so as to direct material between the rollers, said means including a guide plate, a support for said plate, and means for securing the plate in various positions of adjustment longitudinally of the rollers, and so as to direct material at any desired angle toward the bight of said rollers.

8. A machine of the character described comprising means for directing a continuous strip of side wall stock and means for directing a continuous strip of chafer strip into a desired relationship with respect to each other to form a joint between said strips, means for directing a gum strip so that it will overlie said joint, and means for pressing said strips together to form composite tire building material.

WILLIAM C. STEVENS.